(12) United States Patent
Domesle et al.

(10) Patent No.: US 6,710,014 B2
(45) Date of Patent: Mar. 23, 2004

(54) HONEYCOMB BODY MADE OF MATERIAL WITH IMPROVED RADIAL PRESSURE RESISTANCE

(75) Inventors: Rainer Domesle, Alzenau (DE); Thomas Kreuzer, Karben (DE); Egbert Lox, Hanau (DE)

(73) Assignee: DMC2 Degussa Metals Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/852,151

(22) Filed: May 10, 2001

(65) Prior Publication Data

US 2002/0004454 A1 Jan. 10, 2002

(30) Foreign Application Priority Data

May 13, 2000 (DE) .......................................... 100 24 038

(51) Int. Cl.[7] ............................ B01J 21/04; B01J 23/02; B01D 50/00; B32B 15/02; B21D 51/16

(52) U.S. Cl. ............ 502/439; 502/527.11; 502/527.19; 502/527.23; 502/527.24; 422/122; 422/180; 428/116; 428/402; 428/403; 428/688; 29/890

(58) Field of Search ............................ 502/439, 527.11, 502/527.19, 527.23, 527.24; 422/122, 180; 428/116, 402, 403, 688; 29/890

(56) References Cited

U.S. PATENT DOCUMENTS

| | | | | |
|---|---|---|---|---|
| 4,233,351 A | | 11/1980 | Okumura et al. ............ | 428/116 |
| 4,448,833 A | * | 5/1984 | Yamaguchi et al. ......... | 428/116 |
| 4,451,517 A | * | 5/1984 | Inoguchi et al. ............. | 428/116 |
| 4,869,944 A | * | 9/1989 | Harada et al. ............... | 428/116 |
| 5,538,697 A | * | 7/1996 | Abe et al. .................... | 422/171 |
| 5,629,067 A | * | 5/1997 | Kotani et al. ................ | 428/116 |
| 5,855,781 A | * | 1/1999 | Yorita et al. ........... | 210/321.82 |
| 5,952,079 A | * | 9/1999 | Andou et al. ................ | 428/116 |
| 6,156,698 A | * | 12/2000 | Iida et al. .................... | 502/439 |
| 6,159,431 A | * | 12/2000 | Inoue et al. ................. | 422/180 |

FOREIGN PATENT DOCUMENTS

| | | |
|---|---|---|
| DE | 31 09 295 A1 | 12/1981 |
| DE | 195 08 681 A | 9/1995 |
| DE | 195 47 597 A1 | 7/1997 |
| DE | 199 02 540 A1 | 7/1999 |
| DE | 199 25 391 A1 | 12/1999 |
| EP | 0 867 222 A2 | 9/1998 |
| GB | 2 071 639 A | 9/1981 |
| GB | 2 071 640 A | 9/1981 |
| WO | WO 95/11866 | 5/1995 |

OTHER PUBLICATIONS

German Office Action for counterpart application No. 100 24 038.0 dated Jan. 16, 2001.

European Search Report issued in couterpart European Application No. EP 01 11 0713 dated Sep. 25, 2001.

* cited by examiner

Primary Examiner—Mark L. Bell
Assistant Examiner—Patricia L. Hailey
(74) Attorney, Agent, or Firm—Kalow & Springut LLP

(57) ABSTRACT

A honeycomb body made from a ceramic material with improved radial pressure resistance that is of cylindrical shape and features a first and a second end face and a cylindrical shell and that is traversed from one end face to the other by axially parallel channels formed by channel walls and distributed across the cross section of the honeycomb body in a regular grid pattern, in which design an outer marginal zone of the honeycomb body, the thickness of which amounts to several channel diameters, encloses a central area. The increase in radial pressure resistance of the honeycomb body is achieved by reinforcing the ceramic material of the cylindrical shell and of the channel walls in the outer marginal zone of the honeycomb body by depositing on or in it one or several inorganic substances for the purpose of increasing its mechanical stability.

6 Claims, 2 Drawing Sheets

HONEYCOMB BODY MADE OF MATERIAL WITH IMPROVED RADIAL PRESSURE RESISTANCE

The present invention relates to a honeycomb body made of a ceramic material with improved radial pressure resistance.

Ceramic bodies with a honeycomb configuration are used in large quantities in the field of catalysis—especially in the field of catalytic purification of automobile exhaust gases. They serve as the substrates for the catalytic material, which is usually applied to the substrates in the form of a catalytically active coating. These types of catalysts are called coated catalysts below. The substrates are generally of cylindrical shape and feature two end faces and a cylindrical shell. From one end face to the other they are traversed by axially parallel channels, so-called flow channels, through which the exhaust gas to be purified is conducted. Such substrates are also called honeycomb bodies.

The catalytic material that serves for conversion of the hazardous substances contained in the exhaust gases (mainly hydrocarbons, carbon monoxide and nitrogen oxides) mostly consists of high-surface-area powdered materials onto which the actual active catalytic components are deposited in a highly dispersed form. This catalytic material is applied to the separating walls between the flow channels in the form of a coating. In order to coat the separating or channel walls with the powdered materials, initially a coating suspension is produced. In this process, the powdered materials are usually suspended in water. The total solids content (dry matter of the powdered materials) of the suspension customarily ranges, depending on the application, between 30 and 60 wt %, as compared to the total weight of the coating suspension.

The ceramic honeycomb bodies that currently are chiefly used in exhaust gas catalysis are produced by way of extrusion of ceramic masses. They feature square, rectangular or hexagonal flow channels with cell densities (number of flow channels per cross-sectional surface area) of 62 $cm^{-2}$. The wall thickness of the channels in this design amounts to approximately 0.16 mm. The cylindrical shell that confines a honeycomb body usually has the same thickness as the channel walls. In certain designs, however, the cylindrical shell is made a bit thicker than the separating walls of the channels for better mechanical stability.

The freshly extruded honeycomb bodies are first dried. The unsintered bodies produced in this manner are then converted into the final honeycomb bodies by firing at temperatures of up to 1,500° C. (depending on the material). In order to make the honeycomb bodies mechanically sufficiently stable, the firing temperature, depending on the material used, is selected in such a way that the material sinters to form a stable ceramic material. In this process, the specific surface area of the ceramic material is reduced to less than 10, often even less than 2 $m^2/g$. Commonly, these honeycomb bodies are also called inert, since due to their small specific surface area, they are themselves not suited as supports for catalytically active components and participate to only a negligible degree in the catalytic conversion of the harmful substances contained in the exhaust gases.

So-called extruded catalysts must be distinguished from the coated catalysts just described, since they consist, partly or entirely, of catalytically active material and do not have a special catalytically active coating. The material of these extruded catalysts is highly porous and features a high specific surface area. The temperatures used when firing these ceramic bodies range significantly below those used when firing inert honeycomb bodies. For this reason, these honeycomb bodies remain relatively soft even after firing. Due to their low mechanical stability, typical cell densities are limited to 5 $cm^{-2}$ in these honeycomb bodies. The thickness of the separating walls between the flow channels is usually about 1 mm.

In order to improve the catalytic conversion rate for harmful substances, inert honeycomb bodies are being developed at present with cell densities of up to 200 $cm^{-2}$ and wall thicknesses of only 0.1 mm or less. These high cell density honeycomb bodies provide a significantly larger geometrical surface for catalytic coating and, because of their lower mass, heat up significantly faster to the operating temperature of the catalyst.

The mechanical stability of high cell density inert honeycomb bodies, in particular their radial pressure resistance, is inferior to those of honeycomb bodies with conventional cell density, and this poses handling problems during catalyst production, in particular during installation into the converter housing. In order to increase mechanical stability, it is therefore currently being attempted to increase the wall thickness of the external layers of the flow channels that are adjacent to the cylindrical shell, by comparison to those in the center of the honeycomb body. These types of honeycomb bodies have been described, for example, in DE 199 02 540 A1. In the following, they will be called 'non-homogeneous honeycomb bodies', while conventional honeycomb bodies with homogeneous wall thickness—not counting an reinforced cylindrical shell—will be called 'homogeneous honeycomb bodies'. It is difficult to extrude non-homogeneous honeycomb bodies with differing wall thicknesses.

It is known to reinforce the edges, against which the exhaust gas flows, of inert substrates for exhaust gas cleaning catalysts by depositing inorganic substances in or on them, in order to reduce wear through abrasion caused by particles contained in the exhaust gas (DE 195 47 599 C1 and DE 195 47 597 C1). According to these documents, the reinforcement is implemented across the entire cross section of the honeycomb body, extending from the end face of the honeycomb body against which the exhaust gas flows to a depth that can amount to up to 20 times the effective cell diameter.

It is an object of the present invention to provide ceramic honeycomb bodies for exhaust gas purification catalysts that feature a higher radial pressure resistance. The ceramic honeycomb bodies can be substrates for coated catalysts, already-coated substrates, i.e. coated catalysts, or extruded catalysts.

The above and other objects of the present invention can be achieved by a honeycomb body made of a ceramic material, of cylindrical shape with a first and a second end face and a cylindrical shell, which honeycomb body is traversed from one end face to the other by axially parallel channels that are formed by the channel walls and that are distributed over the cross section of the honeycomb body in a regular grid pattern, with an outer marginal zone of the honeycomb body, several channel diameters thick, that encloses a central area. A feature of the honeycomb body is that the ceramic material of the cylindrical shell and of the channel walls in the outer marginal zone of the honeycomb body is reinforced by depositing one or several inorganic substances on or in them, in order to increase mechanical stability.

With the term 'channel diameter' in this context, we refer to the diameter of a circle with the same cross-sectional area as a flow channel.

The invention is based on homogeneous honeycomb bodies, the separation walls between the flow channels of which are of identical thickness. For this reason, the honeycomb bodies can be produced using known techniques, and there are no production problems encountered either when drying or when firing them. The increase of radial pressure resistance is achieved by means of an after-treatment of the outer marginal zones of the honeycomb bodies. However, the invention is not limited to homogeneous honeycomb bodies. Rather, the after-treatment can also be applied to non-homogeneous honeycomb bodies, in which it causes a further reinforcement of their radial pressure resistance.

The honeycomb body is reinforced, for example, by soaking or impregnating the ceramic material of the cylindrical shell and of the channel walls in the exterior marginal zone of the honeycomb body with suitable reinforcing substances or by applying a reinforcing coating to these areas. Aqueous or organic preparations of inorganic substances e.g., solutions or suspensions, are used for the after-treatment of the honeycomb bodies. If necessary, precursor compounds of the reinforcing substances can be used that are converted into the reinforcing form by a subsequent firing process.

Suitable, temperature-stable substances for reinforcement of the honeycomb body are, for example, inorganic fillers or ceramic adhesives for the pores of the honeycomb bodies such as aluminum oxide sol, zirconium dioxide sol, zirconium silicate sol, silicate sol and alkaline silicates such as sodium silicate (sodium water glass) in the form of an aqueous or organic solution or suspension. Also possible are fine-particle glazing, frits or enamels that are mostly molten prior to application of the catalytically active coating or that are melted onto it when the catalytic converter is being operated. The selection of the inorganic substance depends on the material of the substrate and also on the catalytic coating, because it is important to avoid negative effects on the substrate and on the catalytic activity of the catalytic coating.

As glazing, usually glasses made from quartz, alumina, alkalis, alkaline earths and low-melting-point oxides are used as fluxing agents. The frits are usually alkaline borosilicate glasses based on the glass-forming oxides $SiO_2$, $B_2O_3$, $Na_2O$, $K_2O$ and $Al_2O_3$. Enamels are mixtures of fits and ceramic opacifiers such as, for example, oxides of titanium, zirconium, antimony, and molybdenum and possibly coupling agents. The later use as carrier for the catalytically active coating needs to be considered in the actual composition of these materials, so as to avoid negative effects on the catalytic activity. Furthermore, through this composition the hemisphere temperature of these materials can be adjusted to the temperature range of the later application. By means of the composition, the hemisphere temperature can be adjusted within a range of 400 through 1,300° C., and accordingly be tuned to the individual application in an optimal way. The term 'hemisphere temperature' refers to the temperature of a formerly molten test body of the material in question, in which, due to softening of the material, the radius of its base surface is the same as its height.

The thickness of the reinforced outer marginal zone can be adjusted to the requirements of the application. It can amount to up to one third of the equivalent diameter of the honeycomb body. The term 'equivalent diameter of a honeycomb body' refers, in this context, to the diameter of a circle, the area of which is the same as the cross sectional surface of the honeycomb body.

The production of the honeycomb body according to the invention can start with unsintered bodies, with burned honeycomb bodies, or with coated catalytic honeycomb bodies. The ceramic material can consist partially or entirely, i.e. up to 100%, of catalytically active material and may thus form an extruded catalyst. In all cases, the application of the reinforcing substances is performed by means of an aqueous or organic preparation of these substances and by applying known coating techniques. Accordingly, the preparation of the inorganic substance(s) can be deposited on or in the ceramic material of the channel walls of the outer marginal zone by immersion, pouring, injection or suction. In order to avoid, in this process, coating of the flow channels in the central region of the honeycomb body, the end faces in the central area are covered in a suitable manner. This can be accomplished with suitable covers, for example. It is also possible to temporarily plug the channels of the central zone of the honeycomb body with wax or to cover them with adhesive tape, for example.

If necessary after input or supply, the reinforcing substances are dried and then converted to their final form by the firing process, or by being fused on. Depending on the material used, temperatures between 300 and 1,500° C. are necessary for this. If the process starts with unsintered bodies, the unsintered body is transformed into the completed honeycomb body by way of the same process. This requires that the firing conditions be adjusted accordingly.

In the event that solutions or sols are used, it may suffice to spray the cylindrical shell with the aqueous or organic preparation from the outside. Due to the porosity of the honeycomb bodies the precursor compounds of the reinforcing substances traverse the outer marginal area of the honeycomb body. The thickness of the marginal area can be controlled by controlling the quantity and duration of the exposure to the preparation. This mode of reinforcement is particularly effective when using unsintered bodies. In this case, impregnating solutions of so-called mineralizers may also be used. These are additives such as lithium, boron, fluorine and wolfram, which initiate crystallization.

After-treatment of homogeneous and non-homogeneous honeycomb bodies produces honeycomb bodies according to the invention that have improved radial pressure resistance in comparison to honeycomb bodies that have not been treated in this manner. It has additionally been found that the after-treatment also leads to an improvement of radial pressure resistance in substrates with a catalytic coating, i.e., in completed exhaust gas catalysts. Another subject of the invention is, therefore, monolithic coated catalysts on inert substrates, the radial pressure resistance of which has been improved in that the ceramic material of the cylindrical shell and the channel walls in the outer marginal zone of the honeycomb body, as well as the catalytically active coating applied to these walls, have been reinforced by depositing one or several inorganic substances on or in them. The substances already discussed may be used here as reinforcing substances.

The invention will be more clearly explained based on FIGS. 1 through 4. The figures show:

DETAILED DESCRIPTION OF INVENTION

Figure 1:
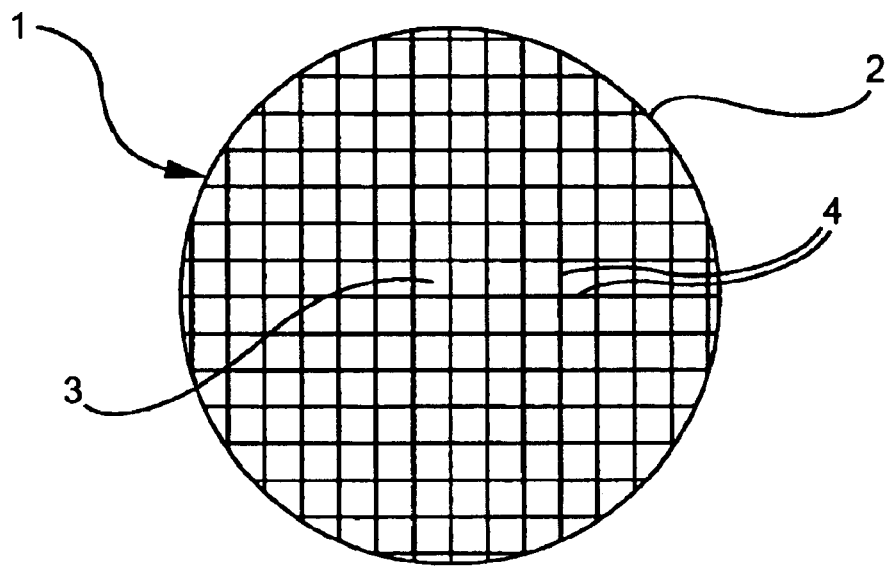
FIG. 1 is a schematic representation the end face of a homogeneous honeycomb body with a shell that is the same thickness as the channel walls.
Figure 2:
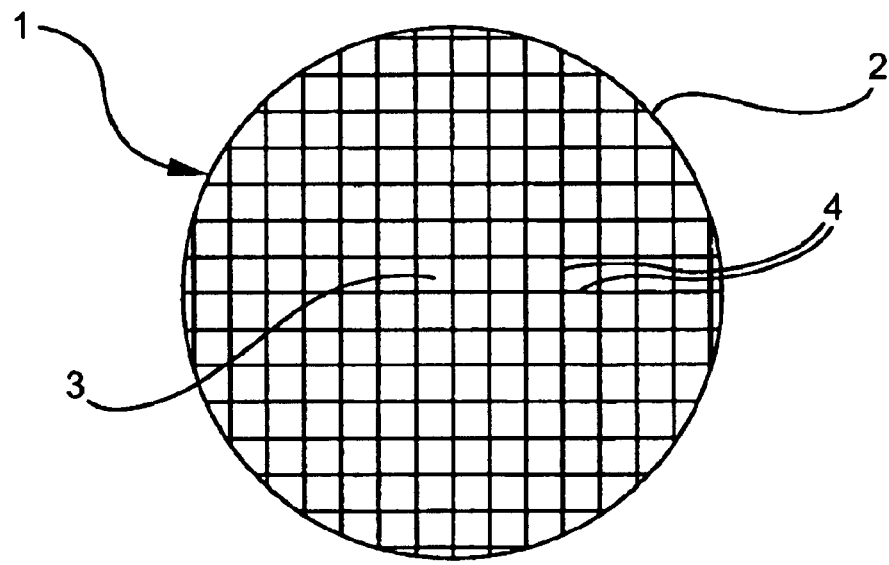
FIG. 2 is a schematic representation of the end face of a homogeneous honeycomb body with a shell that is thicker than the channel walls.
Figure 3:
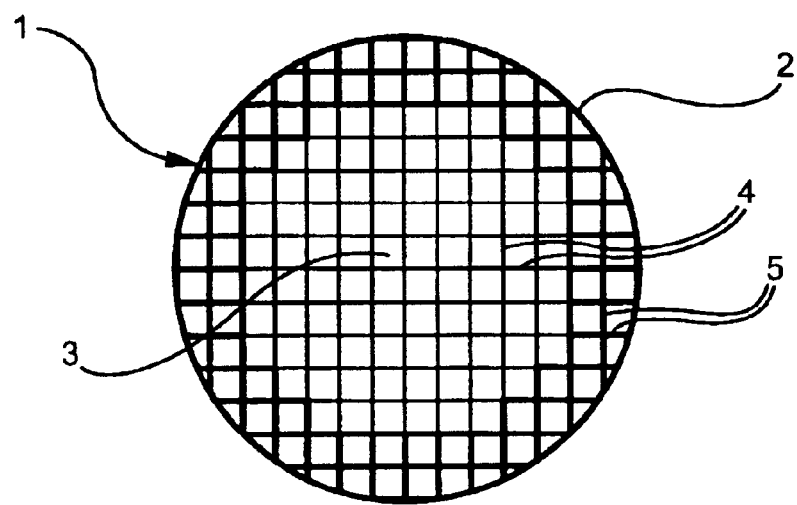
FIG. 3 is a schematic representation of the end face of a non-homogeneous honeycomb body.

FIGS. 1 through 3 show different honeycomb bodies, each with a circular cross section.

FIG. 1 shows a homogeneous honeycomb body, the cylindrical shell of which is of the same thickness as the channel walls. The term 'homogeneous' is used in the context of this invention if the channel walls have the same thickness over the entire cross section of the honeycomb body. By contrast, the thickness of the channel walls in the marginal area of the cross section of a non-homogeneous honeycomb body is increased in comparison to the central area. In the FIGS. 1–3, the number (1) refers to the honeycomb body, (2) refers to the shell of the honeycomb body, (3) refers to a flow channel and (4) refers to the channel or separation walls between the flow channels. In FIGS. 1–3, honeycomb bodies are shown with square flow channel cross sections that are distributed in an even grid over the cross section of the honeycomb body. However, reinforcement of the honeycomb body by means of an after-treatment with suitable inorganic substances can also be applied in the same manner to honeycomb bodies with other channel cross sections-rectangular, triangular or hexagonal.

FIG. 2 shows a homogeneous honeycomb body, the shell of which is thicker than the channel walls.

FIG. 3 shows a view of an end face of a non-homogeneous honeycomb body. The flow channels are formed by the channel walls (4) and (5) respectively. In order to increase the mechanical stability of the honeycomb body, in an outer marginal zone adjacent to the cylindrical shell of the honeycomb body that comprises approximately two layers of flow channels, channel walls (5) are reinforced, in comparison to channel walls (4) in the center of the honeycomb body.

Figure 4:
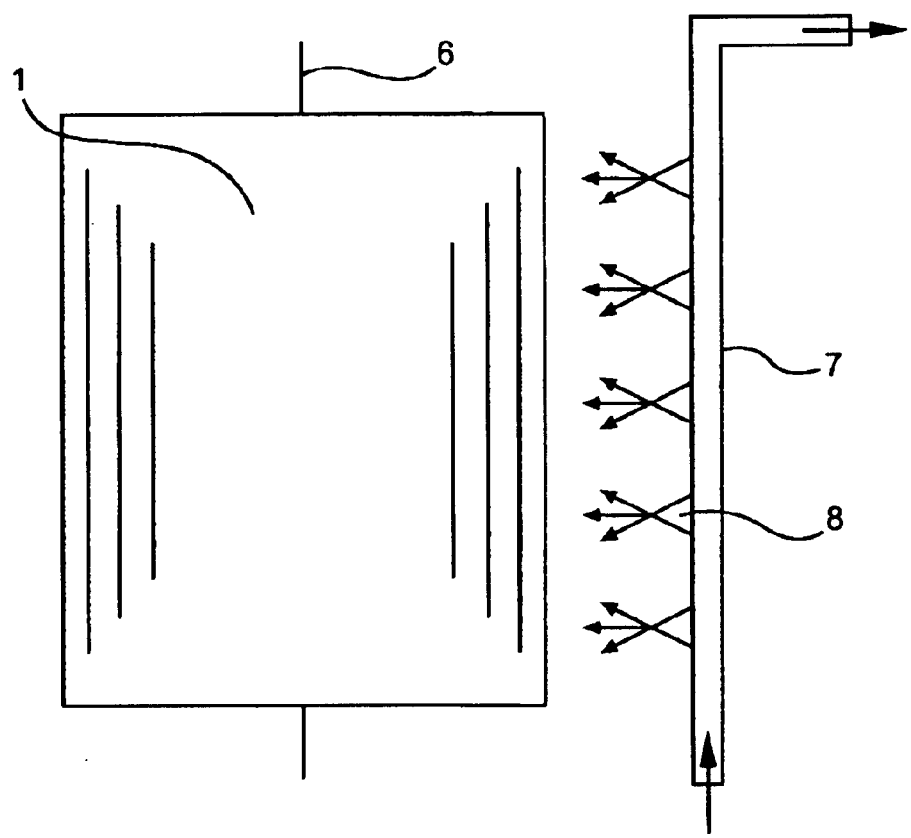
FIG. 4 is a schematic diagram showing impregnation of the cylindrical shell of a honeycomb body with an impregnating solution that contains precursor compounds of the reinforcing inorganic substances.

FIG. 4 shows a special apparatus that can be used in order to impregnate the outer marginal zone of a honeycomb body with reinforcing impregnating solutions. The honeycomb body is rotated around its central axis (6) in front of a series of spray nozzles (8). Spray nozzles (8) are supplied with impregnating solution via a common feed pipe (7). In this manner, the cylindrical shell (1) of the honeycomb body can be impregnated.

The impregnating process can also be performed in a very simple manner by rolling a wet sponge or cloth on the cylindrical shell of the honeycomb body.

Further variations and modifications of the foregoing will be apparent to those skilled in the art and are intended to be encompassed by the claims appended hereto.

German priority application 100 24 038.5 is relied on and incorporated herein by reference.

We claim:

1. A process for the production of a ceramic honeycomb body made of a ceramic material, with improved radial pressure resistance, having a cylindrical shape with a first and a second end face, a cylindrical shell, and channels that traverse the honeycomb body in an axially parallel direction from the first end face to the second end face, wherein the channels are formed by channel walls and are spread in a regular grid pattern across the honeycomb body, in which an outer marginal zone of the honeycomb body of a thickness up to one-third of the equivalent diameter of the honeycomb body encloses a central zone, said process comprising:

producing a ceramic extrudable mass;

extruding said mass to form an unsintered body; and, converting the unsintered body by firing, wherein the ceramic material of the cylindrical shell and of the channel walls in the exterior marginal zone of the honeycomb body are soaked or impregnated with a solution or sol of a reinforcing substance.

2. The process according to claim 1, wherein the reinforcing substance is selected from the group consisting of an aluminum oxide sol, a zirconium dioxide sol, a zirconium silicate sol, a silicate sol and sodium silicate.

3. The process according to claim 1, wherein the cylindrical shell of the sintered body is impregnated by spraying it with said solution or sol of said reinforcing substance.

4. A process for the production of a ceramic honeycomb body made of a ceramic material, with improved radial pressure resistance, having a cylindrical shape with a first end face and a second end face, a cylindrical shell, and channels that traverse the honeycomb body in an axially parallel direction from the first end face to the second end face, wherein channels are formed by channel walls and are spread in a regular grid pattern across the honeycomb body, in which an outer marginal zone of the honeycomb body of a thickness up to one-third of the equivalent diameter of the honeycomb body encloses a central zone, said process comprising:

producing a ceramic extrudable mass;

extruding said mass to form an unsintered body;

soaking or impregnating the channel walls in the exterior marginal zone of the unsintered body with a solution of sol of a reinforcing substance and converting the unsintered body by firing into the honeycomb body.

5. The process according to claim 4, wherein the reinforcing substance is selected from the group consisting of an aluminum oxide sol, a zirconium dioxide sol, a zirconium silicate sol, a silicate sol and sodium silicate.

6. The process according to claim 4, wherein the cylindrical shell of the unsintered body is impregnated by spraying it with said solution or sol of said reinforcing substance.

* * * * *